March 4, 1941.   V. MILLS   2,233,845
PROCESS FOR HYDROLYZING FATS
Filed April 23, 1940
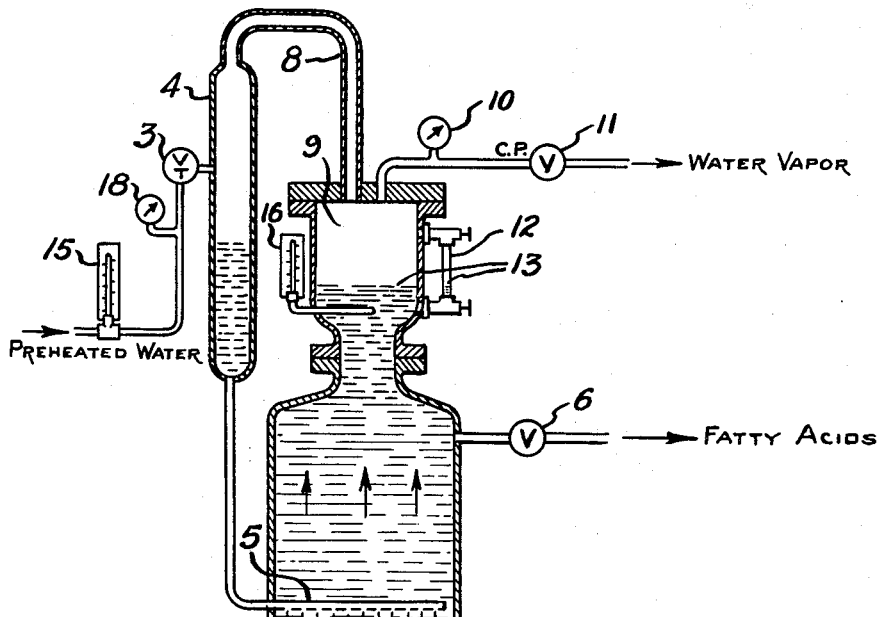
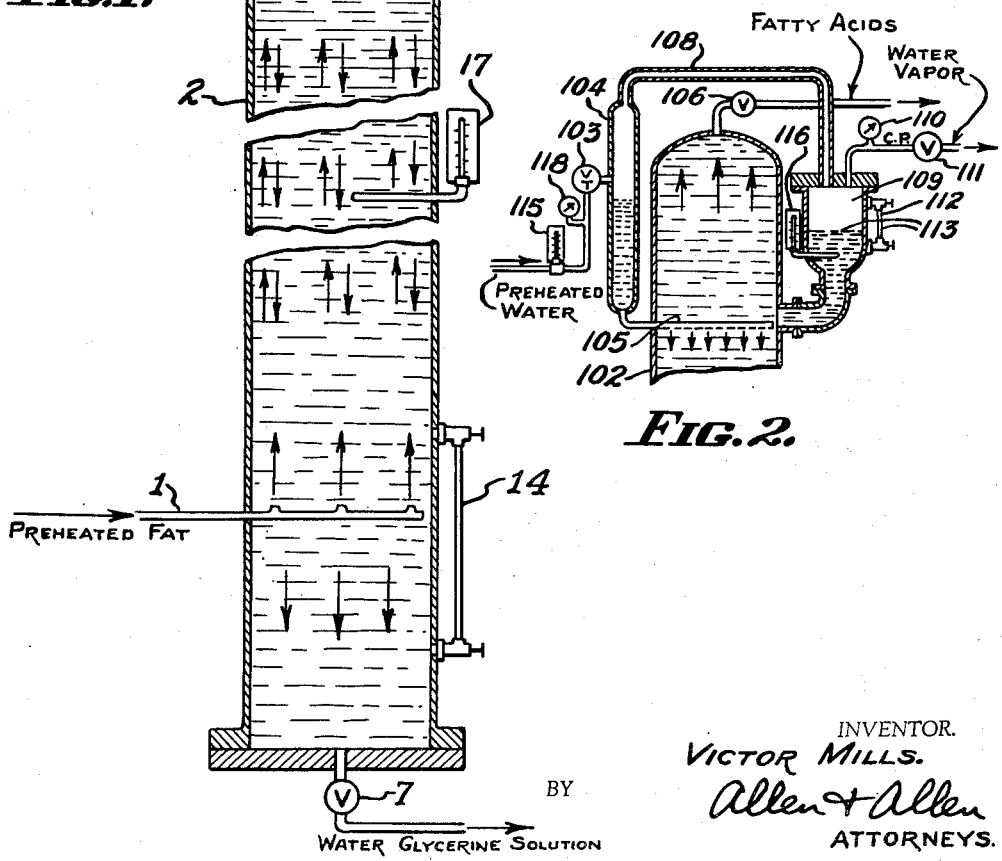
INVENTOR.
VICTOR MILLS.
BY
Allen & Allen
ATTORNEYS.

Patented Mar. 4, 1941

2,233,845

UNITED STATES PATENT OFFICE 2,233,845

PROCESS FOR HYDROLYZING FATS

Victor Mills, Cincinnati, Ohio, assignor to The Procter & Gamble Company, Cincinnati, Ohio, a corporation of Ohio Application April 23, 1940, Serial No. 331,205

12 Claims. (Cl. 260—415)

My invention relates to an improvement in processes for hydrolyzing fats. It consists essentially of an improved method of splitting or hydrolyzing saponifiable fats by a countercurrent flow of fat and water in contact with one another in an enclosed vertical reaction chamber at elevated temperatures and pressures, in which the pressure at the top of the chamber is maintained at a point corresponding to the pressure of saturated steam at the temperature used, thus avoiding the excessively high pressures heretofore used. The uppermost part of the chamber is kept filled with water vapor and excess water vapor is drawn off from the top of the chamber while maintaining the desired pressure therein.

One principal object of my invention is to limit the operation of the high temperature fat hydrolysis process to the lowest possible pressure for the temperature employed, thus avoiding the necessity for excessively strong and costly equipment with high maintenance and operating costs.

Another object is to provide a compressible vapor cushion in connection with the reaction chamber to absorb the pulsations of reciprocating fat and water supply pumps, which without this cushion would cause injurious pressure fluctuations.

Another object is to provide an improved means of obtaining uniform operating pressure by permitting excess water vapor, above that required to maintain the desired uniform pressure, to escape through a pressure control mechanism, which preferably is automatic in its operation.

These and other advantages will become apparent from the detailed disclosure of my invention which follows:

In my Patent No. 2,156,863, issued May 2, 1939, I have described a continuous countercurrent process of hydrolyzing fats which comprises the maintenance of a pressure sufficiently higher than that of saturated steam at the temperature in the chamber to assure that all of the water will remain in the liquid state, even with variations in pressure such as might occur from small unavoidable variations in the operation of pumps or from other causes. My present invention differs from and has certain advantages over this prior patented process, in operating at a pressure no higher than that of saturated steam at the temperature of the liquids in the chamber.

In U. S. Patent No. 2,139,589, issued to Martin Hill Ittner on December 6, 1938, another process is described for the hydrolysis of fats, which process may not be continuous and which involves the maintenance of pressure of about 200 to 250 pounds per square inch in excess of the pressure of saturated steam at the temperature employed. My present invention likewise differs from and has certain advantages over this prior patented process.

In the following discussion of my invention, the term "fat" is to be considered synonymous with "saponifiable fat," "saponifiable oil," "fatty oil," or "glycerides of fatty acids," and the term "hydrolyze" denotes the reaction of fat with water and the resulting production of fatty acids and glycerine.

The accompanying drawing, Figure 1, represents a diagrammatic elevation view, in section, of the essential parts of an apparatus suitable for the carrying out of my invention.

When hydrolyzing according to my invention with the form of apparatus illustrated by Figure 1, fat previously heated to a high temperature is introduced continuously through pipe 1 into the lower part of a suitable vertical enclosed reaction chamber 2, and water previously heated under suitable pressure to a temperature slightly in excess of the temperature of saturated steam at the high pressure existing in the uppermost part of the reaction chamber is introduced continuously through throttle valve 3, stand-pipe 4, and water distributor 5 into the upper part of the same chamber. The fat flows upward through the chamber, and the major portion of the water, which remains in the liquid state, percolates downward in comminuted form from the perforations in distributor 5 through the fat. The water reacts with the fat and liberates fatty acids and glycerine during this countercurrent passage. The liberated fatty acids rise and leave the chamber through the control valve 6 near its top, while the liberated glycerine dissolves in the water and this solution settles and leaves the chamber through control valve 7 near its bottom. A minor portion of the water introduced through throttle valve 3 volatilizes in stand-pipe 4 due to its slight excess in temperature over that of saturated steam at the pressure existing in this portion of the system, the water vapor thus generated passing through pipe 8 into the vapor space 9 in the upper part of the reaction chamber to form a vapor cushion. Excess vapor over that required to maintain the desired pressure in the chamber, as shown by pressure gage 10, is released through the automatic pressure control valve 11 connected to the topmost point of the vapor space and escapes from the apparatus. 12 is a gage glass to show the level of the liquid-vapor interface 13; 14 is a liquid level gage to show the level of the fat-water interface; 15, 16, and 17 are thermometers to show, respectively, the temperatures of the incoming water, of the liquids in the upper part of the chamber at the upper surface of said liquids, and of the liquids about midway between the fat inlet and the water inlet; and 18 is a pressure gage on the water line ahead of throttle valve 3.

Figure 2 represents a diagrammatic elevation view, in section, of an optional modification of the upper part of a suitable apparatus, in which the vapor space is placed to one side of the main reaction chamber and communicates therewith at about the level of the water distributor. The several parts of this modification which correspond with similar parts of the apparatus illustrated in Figure 1 are: a reaction chamber 102, water distributor 105, preheated water thermometer 115, preheated water pressure gage 118, preheated water throttle valve 103, stand-pipe 104, vapor pipe 108, fatty acid outlet control valve 106, liquid surface thermometer 116, vapor pressure gage 110, automatic pressure control valve 111, vapor space 109, gage glass 112, and liquid-vapor interface 113.

I am not limited to the design and construction of the apparatus as illustrated in the drawing, as the same result may be obtained with other suitable equipment of modified design if the same general principles of operation are employed. The vapor required for my improved process may, for example, be generated by a means entirely independent of the supply of preheated water for the hydrolysis reaction. If an independent outside source of vapor is employed, and especially if the pressure of this vapor source is sufficiently uniform, it is possible to dispense with the vapor control valve 11, and to operate with no flow of vapor through space 9. I usually prefer, however, to generate the required vapor by volatilizing a portion of the preheated water, and the present illustration of my process assumes that mode of operation.

The temperature and pressure in the upper part of the reaction chamber are interrelated, this relationship depending on the physical laws governing saturated steam. Thus when either one of these conditions is changed the other will be of necessity also change in accordance with these laws, as long as a saturated water vapor phase is present. The temperature maintained in the reaction chamber is normally at least as high as 300° F. to 350° F. and is preferably somewhere between about 365° F. and about 550° F. The pressure at the upper surface of the liquids in the reaction chamber is the saturation pressure of steam at the existing temperature of the liquids at this point.

The temperature of the water passing thermometer 15 (referring here and in the subsequent discussion to Figure 1) is so regulated before it reaches this point that it will be a few degrees higher than the saturation temperature of steam at the pressure existing in the upper part of the chamber, which is equivalent to saying that it will be a few degrees higher than the temperature indicated by thermometer 16. The pressure on the water passing thermometer 15 is so regulated, by means of throttle valve 3, that it will be at least as high and preferably several pounds higher than the saturation pressure of steam at the temperature indicated by thermometer 15. Water in the liquid state at a temperature above that of saturated steam at the existing pressure is unstable, and under such conditions enough of the water will quickly volatilize to lower the temperature of the remainder to the saturated steam temperature. This phenomenon occurs in the present case as the preheated water passes through throttle valve 3 into the zone of lower temperature and lower pressure existing in the stand-pipe 4 and vapor space 9.

From data obtainable from steam tables it is possible to calculate the amount of water that will volatilize under such conditions for any given temperature differential. Thus an excess inlet water temperature of 5° F. will result in the volatilization of between 0.5% and 1.0% of the incoming water when the preheated water temperature is in the neighborhood of 470° F. to 500° F. This amount of water converted to vapor under the operating pressure will have a volume smaller than that of the total incoming water, and will be a convenient amount for good operating pressure control, although satisfactory results may be obtained with a larger or smaller amount. The desirable range of excess temperature of the inlet water is between about 1° F. and about 10° F.

A temperature differential of 5° F. between the preheated water and the liquids in the upper part of the reaction chamber will, according to steam table data, require the maintenance of a pressure differential at valve 3 of at least 35 to 45 pounds per square inch if the volatilization of water before reaching valve 3 is to be entirely prevented. It is possible to operate satisfactorily with valve 3 wide open, but if this is done some of the volatilization of water will occur before thermometer 15 is reached (if it is located in the water line close to the vapor space as illustrated in the drawing) and this thermometer will then be of no use in gaging the relative amount of water that is converted into vapor. This method of operation is undesirable unless some other means is provided for gaging the relative amount of vapor generated, as for example some means for gaging the vapor discharged through valve 11.

The manner of carrying out my invention will become apparent to those skilled in the art from the following more detailed examples of several means of controlling the operation. Mills' U. S. Patent No. 2,156,863 may also be referred to for further discussion of those parts of the process that are common both to that mode of operation and to my present modification.

In starting up, valve 3 is opened wide, valve 7 is temporarily closed, valve 6 is opened and the automatic control valve 10 is set for the desired operating pressure, for example 500 pounds per square inch gage pressure if a hydrolyzing temperature of about 470° F. is desired. Water preheated to about the temperature of saturated steam at this pressure is then passed at approximately normal operating rate into the reaction chamber 2 through distributor 5, and also for a short time through pipe 1. As soon as the air in the chamber had been well swept out by the steam which will be formed by volatilization of part of this water, valve 6 is closed. The flow of water is continued and when the pressure in the chamber as shown by pressure gage 10 reaches about 200 to 300 pounds the flow of water through pipe 1 is discontinued and the flow of fat preheated to a temperature somewhat higher than that of the water (as more fully explained later) is started into the reaction chamber 2 through pipe 1 at approximately normal operating rate. The pressure in the chamber will gradually increase until the desired operating pressure is reached, and at this time the pressure control valve 11 will begin to operate and will release vapor in sufficient quantity to prevent the pressure in the chamber from exceeding the desired maximum limit. As soon as the liquid level rises in the bottom of the gage glass 12, the two liquid outlet valves 6 and 7 are immediately opened to the proper degree and the inlet water throttle valve 3 is partially closed to the proper degree. The withdrawal of the reaction products, fatty acid through valve 6 and glycerine-water solution through valve 7, then proceeds as long as the supply of preheated fat and preheated water is continued.

The interface between fat and accumulated water glycerine solution is preferably kept at about the level of fat inlet pipe 1. The level of this interface may be adjusted during the start-up period by temporarily opening valve 7 to let out excess water. In normal operation this level may be adjusted either by varying the water supply rate or by varying the water-glycerine outlet rate. If this interface level is too high, for example, it may be lowered either by reducing the water supply rate or by increasing the water-glycerine outlet rate. This it is necessary to maintain a balance between the water inlet rate and the water-glycerine outlet rate. A uniform outlet rate may conveniently be obtained by substituting one or more fixed orifices of graded sizes, each orifice being controlled by a separate shut-off valve, in place of the single control valve 7. Similarly, one or more orifices, each with a valve, may conveniently be substituted for the fatty acid outlet control valve 6.

Whenever the water supply rate is varied the water level in stand-pipe 4 will automatically readjust itself to accommodate the new rate of flow through distributor 5. If the water rate is increased, for example, the water level in stand-pipe 4 will increase until it has developed sufficient static pressure to force the water through distributor 5 at the increased rate of flow. The height of this stand-pipe must be sufficient, in relation to the height of the liquid-vapor interface 13 to accommodate the highest rate of water flow that is to be passed through distributor 5.

During normal operation the interface 13 between liquid and accumulated vapor is kept at a convenient point, preferably about one to two feet below the highest point in the interior of the apparatus, and well above the fatty acid outlet which leads to valve 6. With the fat-water interface level kept approximately constant near the bottom of the chamber, the level of the liquid-vapor interface 13 may be adjusted either by varying the fat supply rate or by varying the fatty acid outlet rate. If this interface level is too high, for example, it may be lowered either by reducing the fat inlet rate or by increasing the fatty acid outlet rate. Thus it is necessary to maintain a balance between the fat inlet rate and the fatty acid outlet rate.

The desired operating pressure in the upper part of the reaction chamber is controlled by the setting of automatic control valve 11 and by maintaining a sufficiently higher water inlet temperature, as shown by thermometer 15, than the temperature of the upper surface of the liquids in the chamber, as shown by thermometer 16, to cause a small fraction of the incoming water to flash or volatilize into vapor as it enters the stand-pipe 4. Thus there is generated a continuous supply of water vapor to maintain a vapor cushion in the chamber, to keep the pressure up to the desired point, and to replace the vapor that is released through valve 11, as this valve operates to prevent the pressure from exceeding the desired pressure.

The temperature of the liquids in the reaction chamber at a point approximately midway between the fat inlet 1 and the inlet water distributor 5, as indicated by the thermometer 17, is maintained at or slightly below the desired hydrolyzing temperature, corresponding to the pressure for which valve 11 is set, by varying the fat inlet temperature. The fat inlet temperature which will produce a given temperature at thermometer 17 cannot readily be predicted with accuracy, except for any given set of operating conditions after experience gained under that set of conditions, because of temperature changes that occur in the lower half of the column of liquids in the chamber due to heats of solution of water in fat and in fatty acids and of glycerine in water, heats of reaction, and heat losses or gains through the walls of the chamber, none of which heat effects are independently measurable during operation. Our experience with this process has shown that, with the reaction chamber so enclosed that heat losses or gains through its walls are relatively unimportant, the combined result of the above mentioned heat effects is such that the fat inlet temperature is necessarily somewhat higher than the temperature at thermometer 17 when this latter temperature is the same as the inlet water temperature at distributor 5. The fat inlet temperature should not, on the other hand, be allowed to become so high as to cause boiling of the water in the chamber. Boiling will not occur unless the temperature at thermometer 17 is allowed to materially exceed the temperature registered by thermometer 16. The suitable fat inlet temperature for a given combination of operating conditions can readily be determined at the conclusion of the start-up operation by starting out with a relatively low fat inlet temperature, say about 25° F. above the desired temperature of thermometer 17 if the preheated fat is substantially dry, and gradually increasing it until the desired temperature at thermometer 17 is reached.

With the temperature properly adjusted at thermometer 17, little or no temperature change will occur from this point up to water distributor 5, or from that point up to fatty acid outlet 6. If, however, the temperature at thermometer 17 differs from that of the inlet water at distributor 5 (which water is at essentially the same temperature as that registered by thermometer 16) this difference will diminish as the fat and fatty acids rise from the level of 17 to the level of 5. Regardless of the temperature at 17, the temperature at 16 will tend to remain at the saturation temperature of steam at the pressure existing in the vapor space, as long as a saturated vapor phase is present. If the liquids at thermometer 16 drop below this temperature a sufficient amount of vapor will condense at the liquid-vapor interface 13 to maintain the temperature-pressure equilibrium. If, on the other hand, the liquids at thermometer 16 or at any lower level rise above the saturation temperature of steam at the pressure existing at that level a sufficient amount of the water in the mixture will volatilize to maintain the temperature-pressure equilibrium.

Briefly summarized, the combination of operation variables demanding constant control for continuous uniform operation of the illustrated form of my process is:

1. Balanced water inlet versus water-glycerine outlet rates to maintain the fat-water interface at a uniform level near the bottom of the reaction chamber.

2. Balanced fat inlet versus fatty acid outlet rates to maintain the liquid-vapor interface at a uniform level near the top of the reaction chamber.

3. Uniform operating pressure established by the setting of the automatic vapor pressure control valve, and by generating a continuous supply of water vapor as provided by item 4—*a* below.

4. Uniform operating temperature, in harmony with the operating pressure, obtained by simultaneously:

*a.* Maintaining the preheated inlet water at a temperature several degrees Fahrenheit above the saturated steam temperature corresponding to the operating pressure, while maintaining this water under sufficient pressure to keep it all in the liquid state; and subsequently allowing its pressure to drop to the operating pressure in the vapor space, thus causing a portion of said water to flash into vapor.

*b.* Maintaining the inlet fat at such a temperature that the temperature of the liquids in the upper half of the chamber corresponds approximately to that of saturated steam at the desired operating pressure.

To facilitate the hydrolysis reaction a suitable catalyst may be employed as, for example, any of the soaps of zinc, calcium or magnesium. The catalyst if used is preferably dissolved in the fat before its preheating and its entry into the reaction chamber. The use of such catalyst in this manner is well known practice.

From the foregoing disclosure of my invention, it is clear that it overcomes several defects and limitations to which countercurrent fat hydrolysis processes have been subject as they have in the past been operated. The essential features of my invention may advantageously be employed in fat hydrolysis processes which are not continuous, as well as in the preferred continuous processes.

I claim:

1. In a countercurrent process for hydrolyzing fats with production of fatty acids and glycerine by bringing the fat and water into contact with one another at high temperature and pressure in an enclosed reaction chamber, the step of maintaining a constant pressure in the upper part of said chamber equal to the pressure of saturated steam at the temperature of the liquids in this part of the chamber, which comprises supplying water vapor at said pressure to a vapor space communicating with the upper part of the reaction chamber to form a vapor cushion.

2. The process of claim 1 in which the water vapor supplied to form a vapor cushion is supplied from the same source as the water used for hydrolyzing.

3. The process of claim 1 in which the water vapor supplied to form a vapor cushion is supplied from an outside source, independent of the water used for hydrolyzing.

4. In a countercurrent process for hydrolyzing fats with production of fatty acids and glycerine by bringing the fat and water into contact with one another at high temperature and pressure in an enclosed reaction chamber, the step of maintaining a constant pressure in the upper part of said chamber equal to the pressure of saturated steam at the temperature of the liquids in this part of the chamber, which comprises supplying water vapor to a vapor space communicating with the upper part of the reaction chamber to form a vapor cushion of relatively small size in proportion to the size of the chamber, and releasing from this vapor space excess water vapor above that required to maintain the said pressure.

5. In a continuous process for hydrolyzing fats with production of fatty acids and glycerine by causing the fat and water to pass in countercurrent direction in contact with each other at high temperature and pressure in a vertical reaction chamber, the step of maintaining a constant pressure in the upper part of said chamber equal to the pressure of saturated steam at the temperature of the liquids in this part of the chamber, which comprises supplying the upper part of the reaction chamber with water to form a vapor cushion, and releasing from the chamber excess water vapor above that required to maintain the said pressure.

6. In a process for hydrolyzing fat by setting up a continuous countercurrent flow of water and fat in a vertical closed reaction chamber at elevated temperature and continuously drawing off fatty acids and a water solution of glycerine, the method of operating at a constant pressure equal to the pressure of saturated steam at the operating temperature employed, comprising introducing the water in liquid condition into a standpipe located near the top of and communicating directly with the said reaction chamber, at a temperature several degrees Fahrenheit higher than the said operating temperature, whereby a small fraction of the water volatilizes upon entering the stand-pipe and passes as vapor from the upper part of the stand-pipe into a space above the liquids in the upper part of the reaction chamber, the excess water vapor above that required to maintain a vapor cushion at the desired pressure being released from the chamber, while the major fraction of the incoming water, which remains in the liquid state, passes from the lower part of the stand-pipe into the liquids in the upper part of the reaction chamber at a point lower than the fatty acid outlet.

7. In a continuous countercurrent process for hydrolyzing fats at high temperature and pressure in an enclosed chamber, the steps of constantly supplying the reaction chamber with an amount of water vapor smaller in volume than the volume of the liquid water used in the process and automatically releasing from the chamber excess vapor above that required to maintain a vapor cushion at a pressure no higher than that of saturated steam at the hydrolyzing temperature.

8. In a continuous countercurrent process for hydrolyzing fats at high temperature and pressure in an enclosed chamber, the steps of creating and maintaining a cushion of water vapor communicating with the upper part of the chamber to absorb pressure pulsations from the liquid feed pumps, said vapor cushion being maintained at a pressure corresponding to that of saturated steam at the temperature of the liquids in the upper part of the chamber.

9. In a continuous countercurrent process for hydrolyzing fats at high temperature in an enclosed reaction chamber, the steps of continuously generating an amount of water vapor smaller in volume than the volume of liquid water used in the process at a pressure at least as high as that existing in the upper part of the reaction chamber, introducing this water vapor into the upper part of the reaction chamber and releasing from the chamber excess water vapor above that required to maintain a vapor cushion at a pressure equal to the saturation pressure of steam at the temperature of the liquids in the upper part of the chamber, whereby the pressure within said chamber is kept at the lowest possible pressure for the hydrolyzing temperature employed.

10. In a continuous countercurrent process for hydrolyzing fats at high temperature in an enclosed reaction chamber, the steps of continuously generating and supplying from an apparatus apart from the hydrolyzing apparatus an amount of water vapor smaller in volume than the volume of liquid water used in the process at a pressure at least as high as that existing in the upper part of the reaction chamber, introducing this water vapor into the upper part of the reaction chamber and releasing from the chamber excess water vapor above that required to maintain a vapor cushion at a pressure equal to the saturation pressure of steam at the temperature of the liquids in the upper part of the chamber, whereby the pressure within said chamber is kept at the lowest possible pressure for the hydrolyzing temperature employed.

11. In a continuous countercurrent process for hydrolyzing fats at a temperature of approximately 470° F. to 500° F., while maintaining a pressure at the upper surface of the liquids in the reaction chamber equal to the pressure of saturated steam at the temperature of the liquids at this point, the steps of preheating the water required for the process while said water remains in a liquid state to a temperature about 5° F. higher than said temperature of the liquids in the chamber, subsequently reducing the pressure of this preheated water to said pressure in the chamber whereby a small fraction of the water volatilizes to form water vapor which passes to the upper part of said chamber, and automatically releasing from the chamber surplus vapor above that required to maintain a vapor cushion at said pressure.

12. In a continuous countercurrent process for hydrolyzing fats at a temperature between about 365° F. and about 550° F. and at a pressure at the upper surface of the liquids in the reaction chamber no higher than that of saturated steam at the temperature of the liquids at this point, the steps of supplying the reaction chamber with an amount of water vapor corresponding to about 0.5% to about 1.0% of the weight of water employed for the hydrolysis process, said water vapor being supplied at a pressure at least as high as said pressure in the chamber, maintaining a vapor cushion in the upper part of the reaction chamber, and releasing from the chamber excess water vapor above that required to maintain the said pressure in the chamber.

VICTOR MILLS.